United States Patent
Sur et al.

(10) Patent No.: US 9,081,558 B2
(45) Date of Patent: *Jul. 14, 2015

(54) SYSTEM AND METHOD FOR DYNAMICALLY CONTROLLING A PLURALITY OF CORES IN A MULTICORE CENTRAL PROCESSING UNIT BASED ON TEMPATURE

(71) Applicant: QUALCOMM Incorporated, San Diego, CA (US)

(72) Inventors: Sumit Sur, Boulder, CO (US); Bohuslav Rychlik, San Diego, CA (US); Steven S. Thomson, San Diego, CA (US); Ali Iranli, San Diego, CA (US); Brian J. Salsbery, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,012

(22) Filed: Feb. 6, 2014

(65) Prior Publication Data

US 2014/0181542 A1 Jun. 26, 2014

Related U.S. Application Data

(63) Continuation of application No. 12/944,564, filed on Nov. 11, 2010, now Pat. No. 8,775,830.

(60) Provisional application No. 61/287,011, filed on Dec. 16, 2009.

(51) Int. Cl.
*G06F 1/26* (2006.01)
*G06F 1/20* (2006.01)
*G06F 1/32* (2006.01)

(52) U.S. Cl.
CPC *G06F 1/26* (2013.01); *G06F 1/206* (2013.01); *G06F 1/3203* (2013.01); *G06F 1/324* (2013.01);

(Continued)

(58) Field of Classification Search
CPC .......... G06F 1/26; G06F 1/206; G06F 1/3203
USPC .......................................................... 713/300
See application file for complete search history.

(56) References Cited

U.S. PATENT DOCUMENTS

| 4,601,008 | A  | 7/1986  | Kato            |
| 5,644,769 | A  | 7/1997  | Hasiguti        |
| 6,073,244 | A  | 6/2000  | Iwazaki         |
| 6,076,171 | A  | 6/2000  | Kawata          |
| 6,804,632 | B2 | 10/2004 | Orenstien et al.|
| 6,829,713 | B2 | 12/2004 | Cooper et al.   |
| 6,978,389 | B2 | 12/2005 | Jahnke          |

(Continued)

FOREIGN PATENT DOCUMENTS

| CN | 1678971 A | 10/2005 |
| CN | 1692326 A | 11/2005 |

(Continued)

OTHER PUBLICATIONS

Kondo M., et al., "Dynamic Processor Throttling for Low Power Computing", IPSJ Transactions on Advanced Computing Systems, Information Processing Society of Japan, May 15, 2004, vol. 45 No. SIG6 (ACS6), pp. 1-11.

(Continued)

*Primary Examiner* — Jaweed A Abbaszadeh
*Assistant Examiner* — Austin Hicks
(74) *Attorney, Agent, or Firm* — Nicholas A. Cole

(57) ABSTRACT

A method of controlling power within a multicore central processing unit (CPU) is disclosed. The method may include monitoring a die temperature, determining a degree of parallelism within a workload of the CPU, and powering one or more cores of the CPU up or down based on the degree of parallelism, the die temperature, or a combination thereof.

28 Claims, 8 Drawing Sheets

(52) U.S. Cl.
CPC .............. *G06F 1/329* (2013.01); *G06F 1/3287* (2013.01); *Y02B 60/1217* (2013.01); *Y02B 60/1275* (2013.01); *Y02B 60/1282* (2013.01); *Y02B 60/144* (2013.01)

(56) References Cited

U.S. PATENT DOCUMENTS

| | | | |
|---|---|---|---|
| 7,043,405 B2 | 5/2006 | Orenstien et al. |
| 7,058,824 B2 | 6/2006 | Plante et al. |
| 7,107,187 B1 | 9/2006 | Saghier et al. |
| 7,133,806 B2 | 11/2006 | Prasad |
| 7,134,031 B2 | 11/2006 | Flautner |
| 7,219,245 B1 | 5/2007 | Raghuvanshi |
| 7,233,188 B1 | 6/2007 | Takano et al. |
| 7,263,457 B2 | 8/2007 | White et al. |
| 7,346,787 B2 | 3/2008 | Vaidya et al. |
| 7,369,967 B1 | 5/2008 | Washburn et al. |
| 7,370,189 B2 | 5/2008 | Fischer et al. |
| 7,398,407 B2 | 7/2008 | Jorgenson et al. |
| 7,401,240 B2 | 7/2008 | Heller, Jr. et al. |
| 7,437,581 B2 | 10/2008 | Grochowski et al. |
| 7,467,291 B1 | 12/2008 | Cockroft et al. |
| 7,500,124 B2 | 3/2009 | Seo |
| 7,543,161 B2 | 6/2009 | Olszewski et al. |
| 7,624,295 B2 | 11/2009 | Taketoshi et al. |
| 7,650,527 B2 | 1/2010 | Rambo et al. |
| 7,669,067 B2 | 2/2010 | Degenhardt |
| 7,689,838 B2 | 3/2010 | Srinivasan et al. |
| 7,711,966 B2 | 5/2010 | Prabhakaran et al. |
| 7,761,874 B2 | 7/2010 | Bodas |
| 7,783,906 B2 | 8/2010 | Turner et al. |
| 7,849,349 B2 | 12/2010 | Tamlyn |
| 7,949,887 B2 | 5/2011 | Gunther et al. |
| 8,650,426 B2 | 2/2014 | Rychlik et al. |
| 2002/0029353 A1 | 3/2002 | Hwang |
| 2002/0046354 A1 | 4/2002 | Ostrom et al. |
| 2002/0188877 A1 | 12/2002 | Buch |
| 2003/0115495 A1 | 6/2003 | Rawson et al. |
| 2003/0177163 A1 | 9/2003 | Nomura |
| 2004/0225902 A1 | 11/2004 | Cesare et al. |
| 2004/0254765 A1 | 12/2004 | Lee et al. |
| 2006/0036878 A1 | 2/2006 | Rothman et al. |
| 2006/0123253 A1 | 6/2006 | Morgan et al. |
| 2006/0149975 A1 | 7/2006 | Rotem et al. |
| 2007/0016815 A1 | 1/2007 | Cooper et al. |
| 2007/0033425 A1 | 2/2007 | Clark |
| 2007/0033526 A1 | 2/2007 | Thompson et al. |
| 2007/0061108 A1 | 3/2007 | DeWitt et al. |
| 2007/0255929 A1 | 11/2007 | Kasahara et al. |
| 2008/0005591 A1 | 1/2008 | Trautman et al. |
| 2008/0028244 A1 | 1/2008 | Capps et al. |
| 2008/0162965 A1 | 7/2008 | Marinas et al. |
| 2008/0168287 A1 | 7/2008 | Berry et al. |
| 2008/0201591 A1 | 8/2008 | Hu et al. |
| 2008/0310099 A1 | 12/2008 | Monferrer et al. |
| 2009/0037922 A1 | 2/2009 | Herington |
| 2009/0049314 A1 | 2/2009 | Taha et al. |
| 2009/0106576 A1 | 4/2009 | Jacobowitz et al. |
| 2009/0150695 A1 | 6/2009 | Song et al. |
| 2009/0150696 A1 | 6/2009 | Song et al. |
| 2009/0187775 A1 | 7/2009 | Ishikawa |
| 2009/0217276 A1 | 8/2009 | Brenner et al. |
| 2009/0230930 A1 | 9/2009 | Jain et al. |
| 2009/0249347 A1 | 10/2009 | Henmi |
| 2009/0271646 A1 | 10/2009 | Talwar et al. |
| 2009/0276642 A1 | 11/2009 | Burton et al. |
| 2010/0037038 A1 | 2/2010 | Bieswanger et al. |
| 2010/0076733 A1 | 3/2010 | Kumar et al. |
| 2010/0122101 A1 | 5/2010 | Naffziger et al. |
| 2010/0169609 A1 | 7/2010 | Finkelstein et al. |
| 2010/0299541 A1 | 11/2010 | Ishikawa et al. |
| 2011/0023047 A1 | 1/2011 | Memik et al. |
| 2011/0145559 A1 | 6/2011 | Thomson et al. |
| 2011/0145605 A1 | 6/2011 | Sur et al. |
| 2011/0145615 A1 | 6/2011 | Rychlik et al. |
| 2011/0145617 A1 | 6/2011 | Thomson et al. |
| 2011/0145624 A1 | 6/2011 | Rychlik et al. |
| 2011/0145824 A1 | 6/2011 | Thomson et al. |
| 2013/0074085 A1 | 3/2013 | Thomson et al. |
| 2013/0151879 A1 | 6/2013 | Thomson et al. |

FOREIGN PATENT DOCUMENTS

| | | |
|---|---|---|
| CN | 101076770 A | 11/2007 |
| CN | 101111814 A | 1/2008 |
| CN | 101135928 A | 3/2008 |
| CN | 101211215 A | 7/2008 |
| CN | 101241390 A | 8/2008 |
| CN | 101351759 A | 1/2009 |
| CN | 101401056 A | 4/2009 |
| CN | 101403944 A | 4/2009 |
| CN | 101414268 A | 4/2009 |
| CN | 101436098 A | 5/2009 |
| EP | 0098169 A2 | 1/1984 |
| EP | 0942363 A2 | 9/1999 |
| EP | 1496424 A2 | 1/2005 |
| GB | 2445167 A | 7/2008 |
| JP | H0351902 A | 3/1991 |
| JP | 8006681 A | 1/1996 |
| JP | H08190535 A | 7/1996 |
| JP | H10268963 A | 10/1998 |
| JP | H11282695 A | 10/1999 |
| JP | 2002099433 A | 4/2002 |
| JP | 2004533674 A | 11/2004 |
| JP | 2005128937 A | 5/2005 |
| JP | 2006011548 A | 1/2006 |
| JP | 2008059054 A | 3/2008 |
| JP | 2008117397 A | 5/2008 |
| JP | 2008513912 A | 5/2008 |
| JP | 2008129846 A | 6/2008 |
| JP | 2008165798 A | 7/2008 |
| JP | 2008269249 A | 11/2008 |
| JP | 2009503728 A | 1/2009 |
| JP | 2009037335 A | 2/2009 |
| JP | 2009140157 A | 6/2009 |
| JP | 2009169858 A | 7/2009 |
| JP | 2009238024 A | 10/2009 |
| JP | 2010518525 A | 5/2010 |
| KR | 20070049226 A | 5/2007 |
| KR | 20090107490 A | 10/2009 |
| TW | 200907660 A | 2/2009 |
| WO | WO-0225414 A2 | 3/2002 |
| WO | WO-02074046 A2 | 9/2002 |
| WO | WO-2004044720 A2 | 5/2004 |
| WO | WO-2005119412 A1 | 12/2005 |
| WO | WO-2006037119 A2 | 4/2006 |
| WO | WO-2007007300 A2 | 1/2007 |
| WO | WO-2007019003 A2 | 2/2007 |
| WO | WO-2008047179 A1 | 4/2008 |

OTHER PUBLICATIONS

Compaq et al, "Advanced Configuration and Power Interface Specification", Compaq Computer Corporation, Intel Cor0poration, Microsoft Corporation, Phoenix Technologies Ltd., Toshiba Corporation, Revision 2.0, Jul. 27, 2000.
iDebian, CPU frequency scaling in Linux, Jun. 26, 2009, iDebian's Weblog.
International Search Report and Written Opinion—PCT/US2010/059560—ISA/EPO—Jun. 15, 2011.
Kanai J, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86.
Semeraro, et al., "Energy-Efficient Processor Design Using Multiple Clock Domains with Dynamic Voltage and Frequency Scaling," International Symposium on High-Performance Computer Architecture, pp. 0029, Eighth International Symposium on High-Performance Computer architecture (HPCA'02), 2002, Boston, Massachusetts. ISBN: 0-7695-1525-8.
Satllings, W., "Operating systems internals and design principles," 2005, Pearson, 5th edition, section 3.2, pp. 111-126.

(56) References Cited

OTHER PUBLICATIONS

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

Sasaki H., et al., "Dynamic Optimization for Cmp by Efficient Regression Modeling", Ipsj Sig Technical Reports, Japan, Information Processing Society of Japan, Jul. 29, 2008, vol. 2008, No. 75, pp. 31-36. 1:811.

SYSTEM AND METHOD FOR DYNAMICALLY CONTROLLING A PLURALITY OF CORES IN A MULTICORE CENTRAL PROCESSING UNIT BASED ON TEMPATURE

RELATED APPLICATIONS

This application is a continuation of U.S. patent application Ser. No. 12/944,564 entitled "System And Method For Dynamically Controlling A Plurality Of Cores In A Multicore Central Processing Unit Based On Temperature" filed on Nov. 11, 2010, which claims the benefit of priority to U.S. Provisional Patent Application Ser. No. 61/287,011, entitled "System And Method Of Dynamically Controlling A Plurality Of Cores In A Multicore Central Processing Unit", filed on Dec. 16, 2009, the entire contents of each of which are hereby incorporated by reference for all purposes.

CROSS-REFERENCED APPLICATIONS

The present application is also related to U.S. patent application Ser. No. 12/944,140, entitled "System And Method For Controlling Central Processing Unit Power Based On Inferred Workload Parallelism" filed on Nov. 11, 2010; U.S. patent application Ser. No. 12/944,202 entitled "System And Method For Controlling Central Processing Unit Power In A Virtualized System" filed on Nov. 11, 2010; U.S. patent application Ser. No. 12/944,321 entitled "System And Method For Asynchronously And Independently Controlling Core Clocks In A Multicore Central Processing Unit" filed on Nov. 11, 2010; U.S. patent application Ser. No. 12/944,378 entitled "System And Method For Controlling Central Processing Unit Power With Reduced Frequency Oscillations" filed on Nov. 11, 2010; U.S. patent application Ser. No. 12/944,467 entitled "System And Method For Controlling Central Processing Unit Power With Guaranteed Transient Deadlines" filed on Nov. 11, 2010; and U.S. patent application Ser. No. 12/944,561, entitled "System And Method For Controlling Central Processing Unit Power With Guaranteed Steady State Deadlines" filed on Nov. 11, 2010, the entire contents of each of which are hereby incorporated by reference for all purposes.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of controlling power within a multicore CPU.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
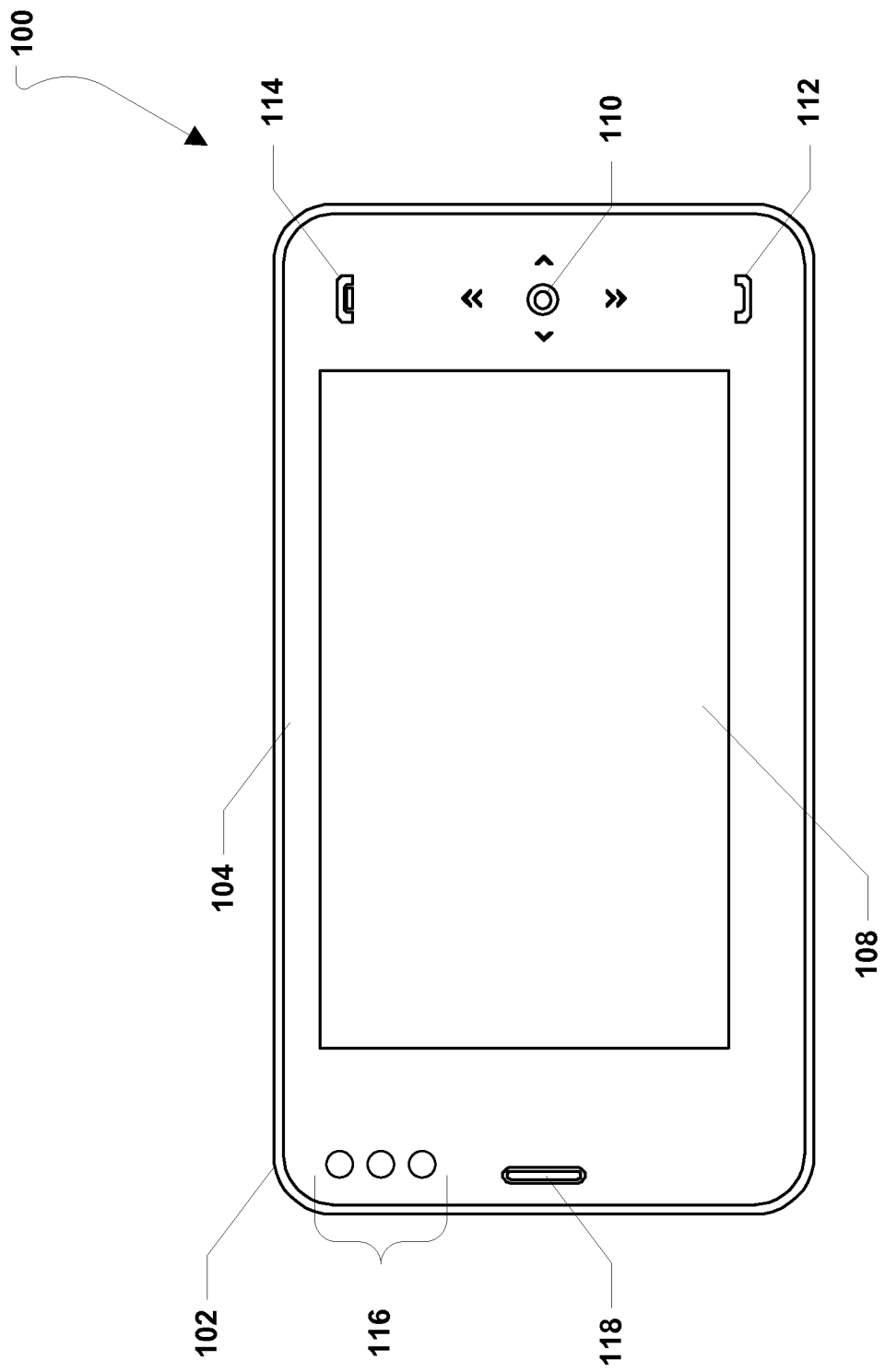
FIG. 1 is a front plan view of a first aspect of a portable computing device (PCD) in a closed position.
Figure 2:
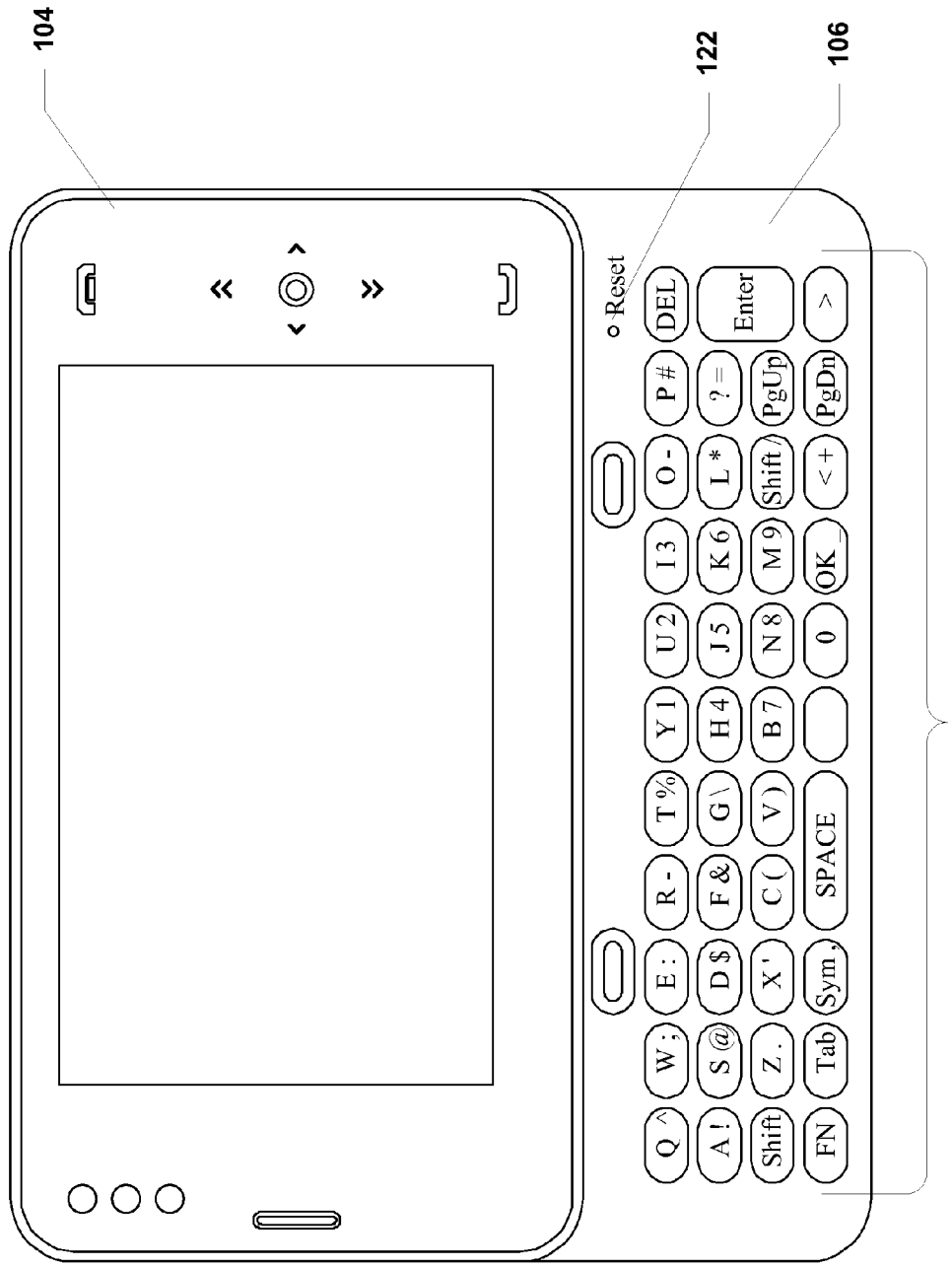
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
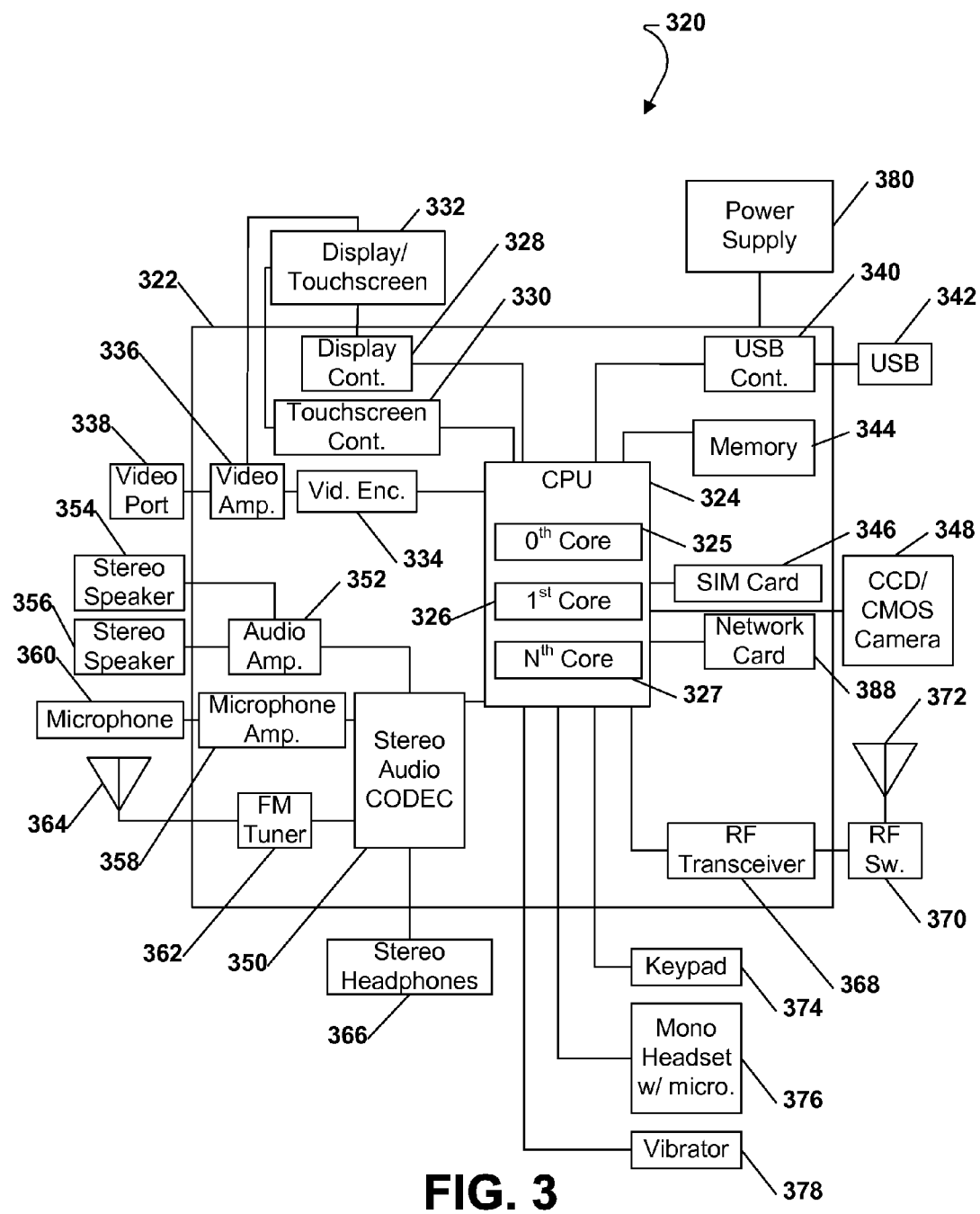
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

The PCD 320 may further include a temperature sensor 382 that may be used to sense a die temperature associated with the PCD 320. In other words, the temperature sensor 382 may act as a means for sensing a die temperature associated with the PCD 320.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, temperature sensor 382, or a combination thereof may serve as a means for executing one or more of the method steps described herein in order to control a multicore central processing unit based on temperature.

Figure 4:
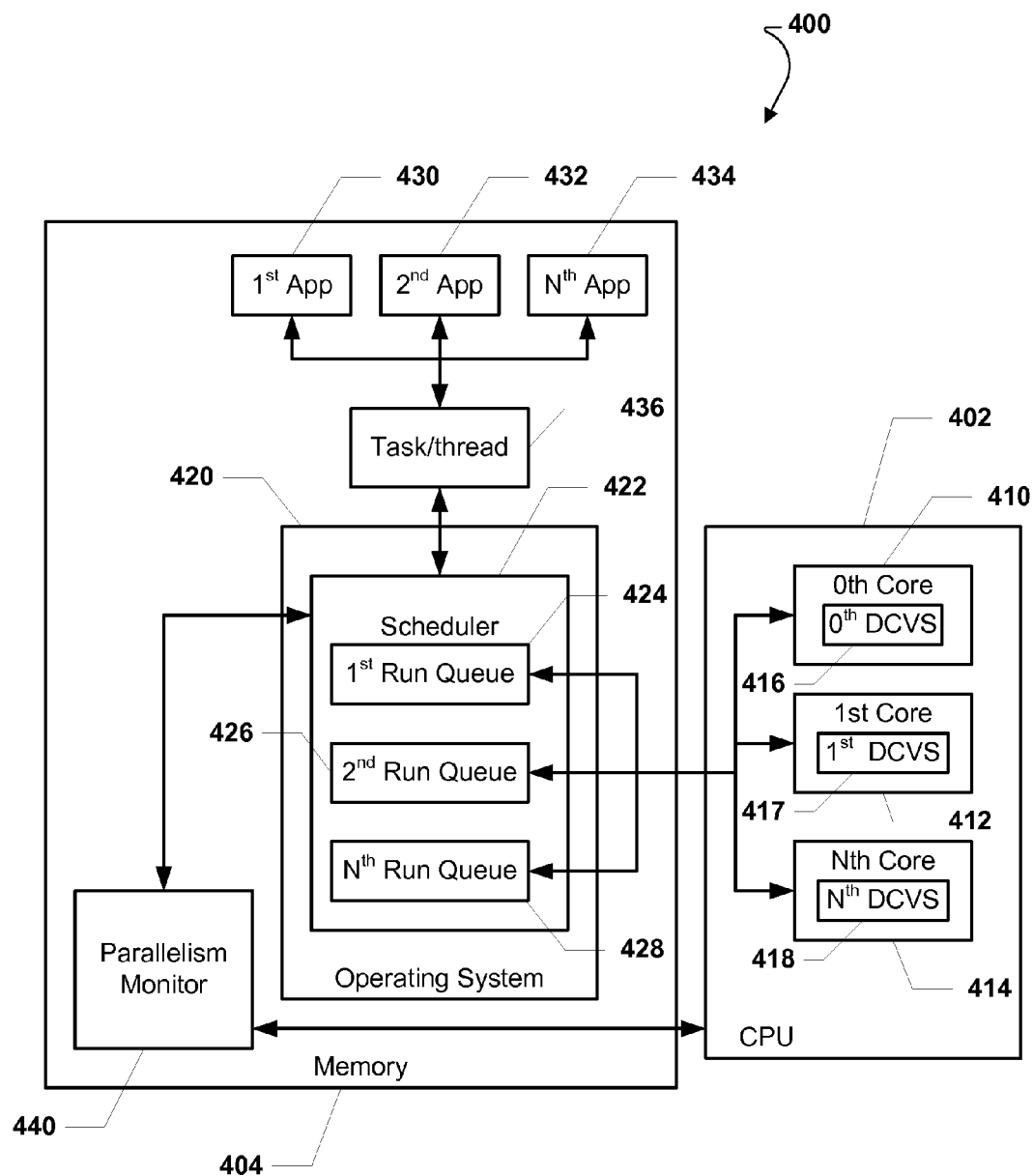
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a parallelism monitor 440 stored thereon. The parallelism monitor 440 may be connected to the operating system 420 and the multicore CPU 402. Specifically, the parallelism monitor 440 may be connected to the scheduler 422 within the operating system 420. As described herein, the parallelism monitor 440 may monitor the workload on the cores 410, 412, 414 and the parallelism monitor 440 may control the power to the cores 410, 412, 414 as described below.

In a particular aspect, the parallelism monitor 440 may be a software program that monitors the run queues 424, 426, 428 in the scheduler 422. Each run queue 424, 426, 428 (aka, ready-to-run queue) may include a list of current tasks, threads, or a combination thereof that are available for scheduling on one or more cores 410, 412, 414. Some multicore systems may only have a single ready-to-run queue. Other multicore systems may have multiple ready-to-run queues. Regardless, of the number of ready-to-run queues, at any instant in time, the total number of tasks, threads, or a combination thereof waiting on these queues, plus a number of tasks, threads, or a combination thereof actually running, may be an approximation for the degree of parallelism in the workload.

Figure 5:
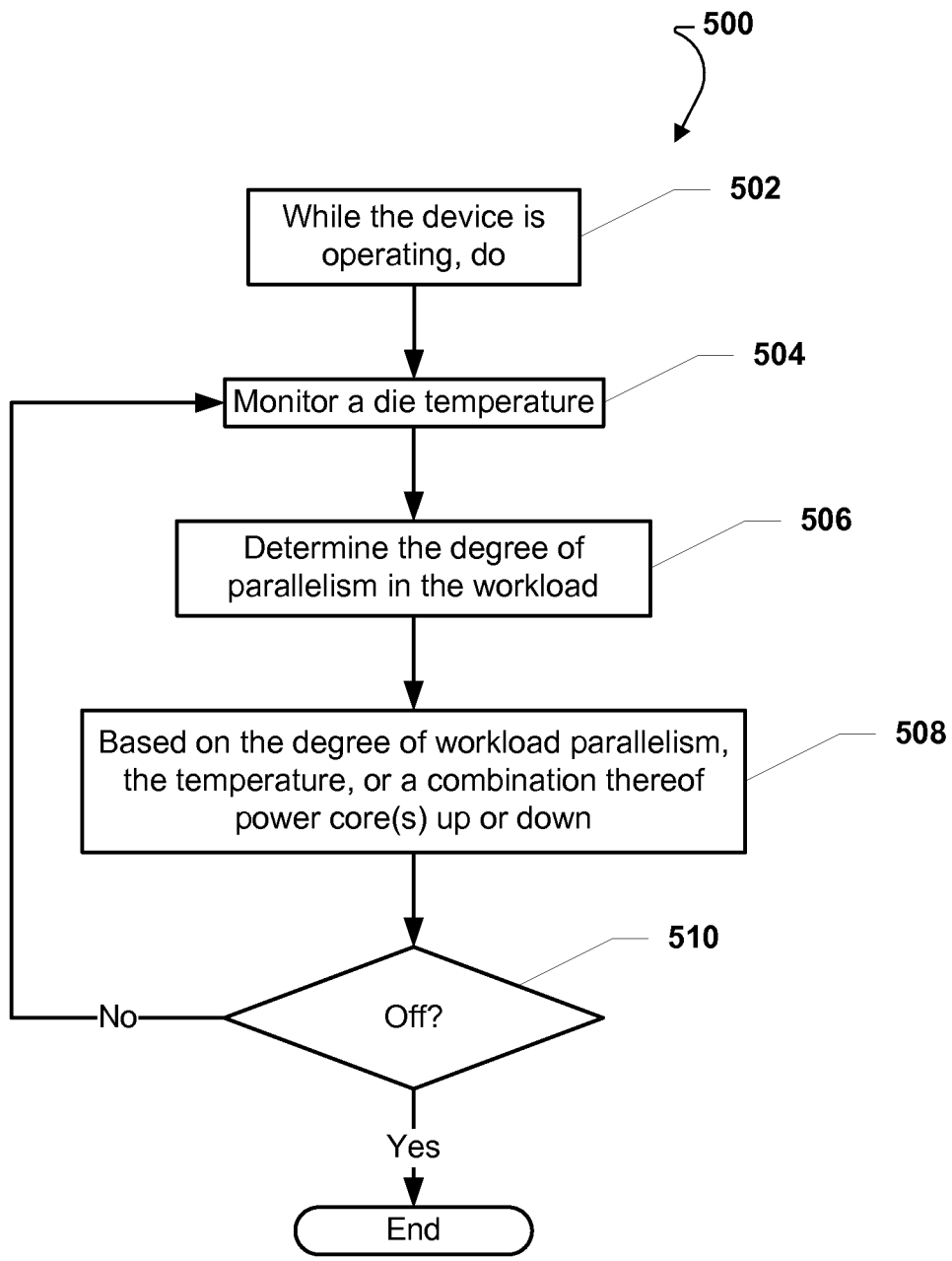
FIG. 5 is a flowchart illustrating a first aspect of a method of controlling a multicore central processing unit based on temperature.

Referring to FIG. 5, a first aspect of a method of controlling a multicore central processing unit based on temperature is shown and is generally designated 500. The method 500 may commence at block 502 with a do loop in which when device is powered on, the following steps may be performed.

At block 504, a die temperature may be monitored. Further, at block 506, a power controller may determine a degree of parallelism in the workload associated with the cores.

Moving to block 508, the power controller may independently power the cores up or down based on the degree of workload parallelism, the die temperature, or a combination thereof. Next, at decision 510, the power controller may determine whether the device is powered off. If the device is powered off, the method may end. Otherwise, if the device remains powered on, the method 500 may return to block 504 and the method 500 may continue as described.

Figure 6:
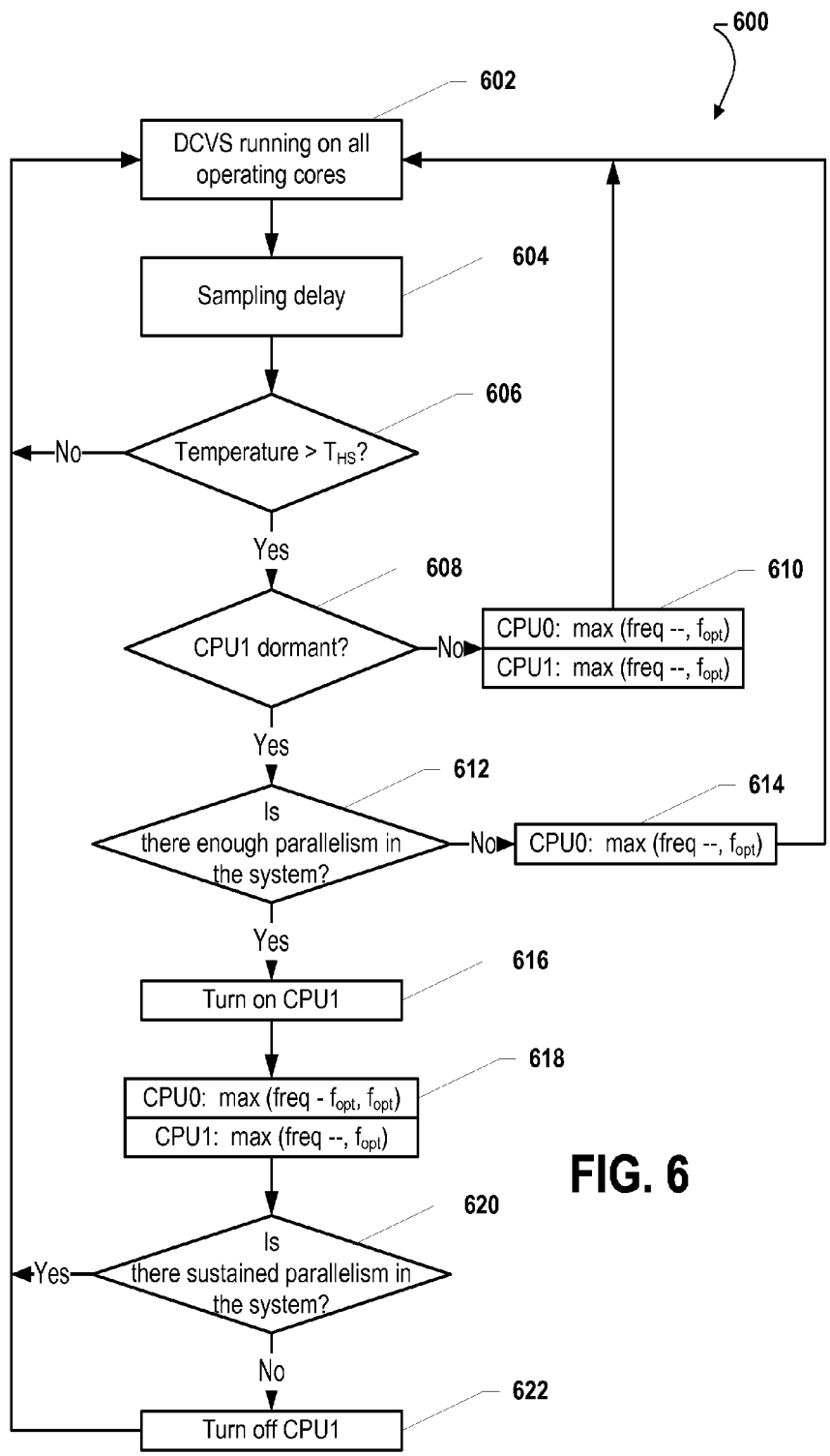
FIG. 6 is a flowchart illustrating a second aspect of a method of controlling a multicore central processing unit based on temperature.

Referring to FIG. 6, a second aspect of a method of controlling a multicore central processing unit based on temperature is shown and is generally designated 600. The method 600 may commence at block 602 with dynamic clock and voltage scaling (DCVS) algorithm running, or executing, on all operating cores within a multicore central processing unit. Moving to block 604, a sampling delay may be performed. In a particular aspect, the sampling delay may be one hundred milliseconds or less. In another aspect, the sampling delay may be fifty milliseconds or less. The sampling delay may be introduced in order to prevent very quick churn in the system. Further, it typically takes some time to wake up another core and the sampling delay may be larger than the wake time.

Moving to decision 606, a core controller may determine whether the die temperature is equal to a critical condition. For example, the critical condition may be threshold temperature above which operation of the device may begin to break down due to temperature issues.

At decision 606, if the die temperature does not equal a critical condition, the method 600 may return to block 602 and the method 600 may continue as described herein. Otherwise, if the die temperature does equal a critical condition, the method 600 may move to decision 608 and the core controller may determine whether a second core is dormant, e.g., the second core may be a CPU1 (the first core may be CPU0).

If the second core is not dormant, i.e., CPU1 is active and executing tasks and threads, the method 600 may proceed to block 610. At block 610, the frequency of the first core, CPU0, may be set, or otherwise moved, to the maximum of lowering the frequency of the first core one incremental step and an optimal frequency, $F_{opt}$. In other words, the core controller may reduce the frequency of the second core one incremental step without going below an optimal frequency, $F_{opt}$. The incremental step may be one hundred megahertz (100 MHz) or less. Further, the incremental step may be fifty megahertz (50 MHz) or less. From block 610, the method 600 may return to block 602 and the method 600 may continue as described.

Returning to decision 608, if CPU1 is dormant, i.e., CPU1 is powered off, the method 600 may proceed to decision 612. At decision 612, a controller may determine whether a degree of parallelism meets a condition. Specifically, the controller may determine whether the degree of parallelism is greater than a predetermined threshold indicating that there is enough parallelism in the system to warrant the operation of a second core, CPU1.

At decision 612, if the degree of parallelism does not meet the condition, the method may move to block 614 and the frequency of the first core, CPU0, may be set, or otherwise moved, to the maximum of lowering the frequency of the first core one incremental step and an optimal frequency, $F_{opt}$. In other words, the core controller may reduce the frequency of the second core one incremental step without going below an optimal frequency, $F_{opt}$. Thereafter, the method 600 may return to block 602 and the method 600 may continue as described herein.

Returning to decision 612, if the degree of parallelism meets the condition, the method may proceed to block 616 and the second CPU, CPU1, may be turned on. Thereafter, at block 618, the frequency of the second core, CPU1, may be set to an optimal frequency, $F_{opt}$. Also, at block 618, the frequency of the first core, CPU0, may be set to the maximum of the current frequency of the first core minus the optimal frequency, $F_{opt}$, or the optimal frequency, $F_{opt}$. For example, if CPU0 is operating at one thousand megahertz (1000 MHz) and CPU1 is powered on to an optimal frequency of six hundred megahertz (600 MHz), the frequency of CPU0 may be changed to six hundred megahertz (600 MHz) because 1000 MHz minus 600 MHz is equal to four hundred megahertz (400 MHz) and 600 MHz (the optimal frequency, $F_{opt}$) is greater than 400 MHz (the result of the subtraction operation).

In another example, if CPU0 is operating at one thousand four hundred megahertz (1400 MHz) and CPU1 is powered on to an optimal frequency of six hundred megahertz (600 MHz), the frequency of CPU0 may be changed to eight hundred megahertz (800 MHz) because 1400 MHz minus 600 MHz is equal to eight hundred megahertz (800 MHz) and 800 MHz (the result of the subtraction operation) is greater than 600 MHz (the optimal frequency, $F_{opt}$).

Moving to decision 620, the controller may determine whether there is sustained parallelism in the system. In other words, the controller may determine whether the degree of parallelism in the system meets a condition for at least a predetermined amount of time. The condition may be a threshold value of parallelism and if the parallelism in the system is greater than the threshold value, the condition may be considered met. At decision 620, if the parallelism is sustained, the method 600 may return to block 602 and the method 600 may continue as described herein.

Returning to decision 620, if the parallelism is not sustained, the method 600 may proceed to block 622 and the second core, CPU1, may be turned off. Thereafter, the method 600 may return to block 602 and the method 600 may continue as described herein.

Figure 7:
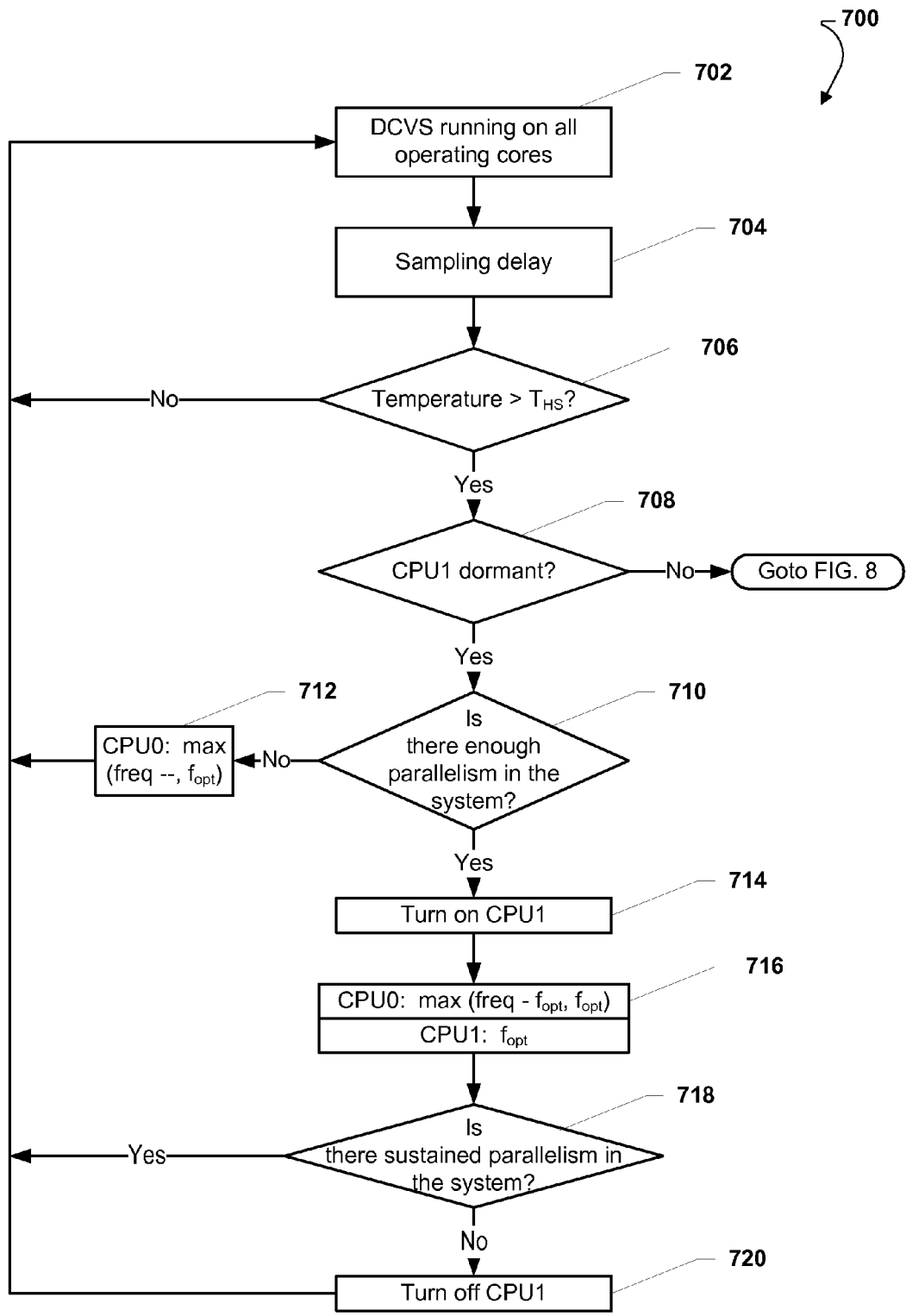
FIG. 7 is a flowchart illustrating a first portion of a third aspect of a method of controlling a multicore central processing unit based on temperature.
Figure 8:
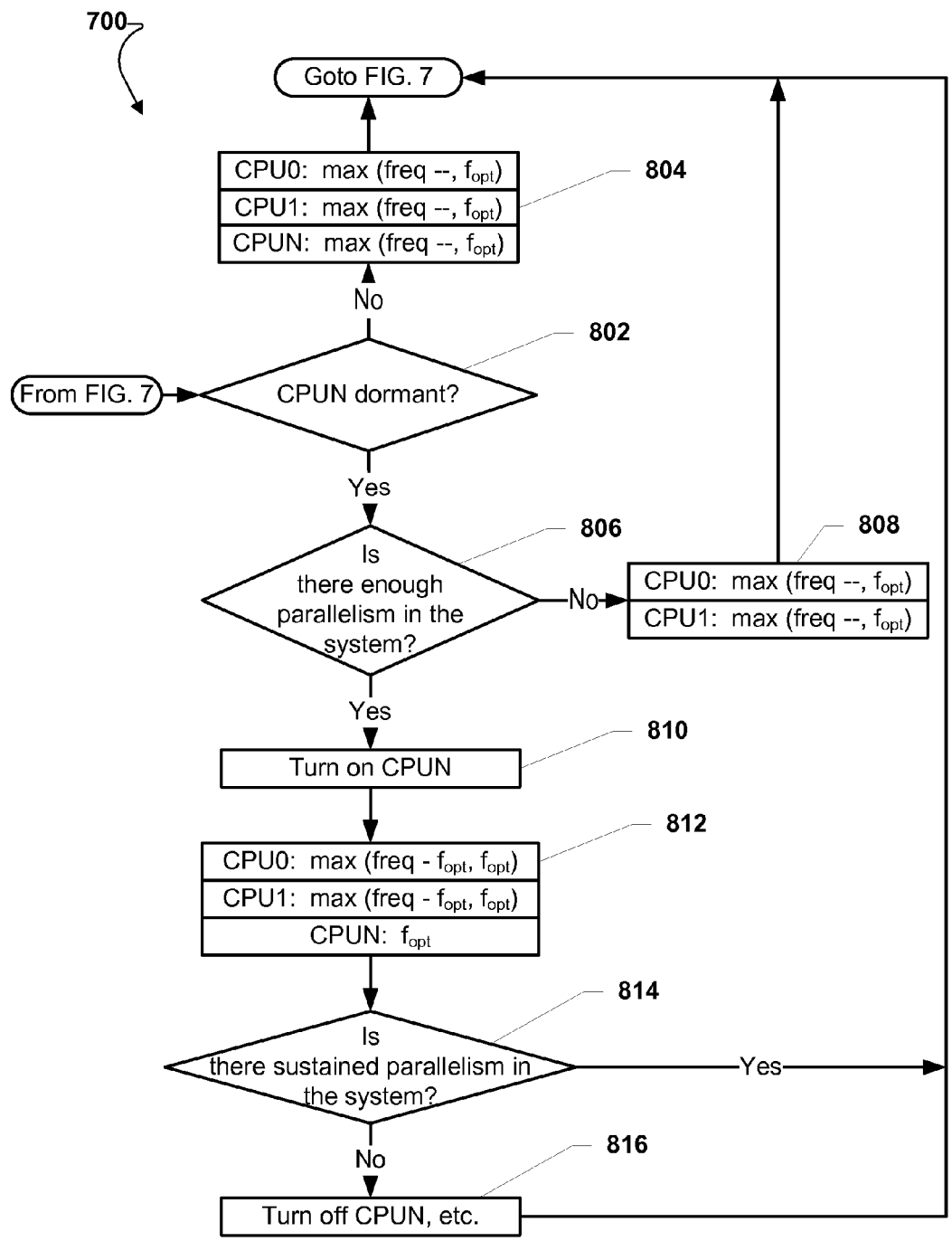
FIG. 8 is a flowchart illustrating a second portion of the third aspect of a method of controlling a multicore central processing unit based on temperature.

Referring now to FIG. 7 and FIG. 8, a third aspect of a method of controlling a multicore central processing unit based on temperature is shown and is generally designated 700. The method 700 may commence at block 702 with dynamic clock and voltage scaling (DCVS) algorithm running, or executing, on all operating cores within a multicore central processing unit. Moving to block 704, a sampling delay may be performed. In a particular aspect, the sampling delay may be one hundred milliseconds or less. In another aspect, the sampling delay may be fifty milliseconds or less. The sampling delay may be introduced in order to prevent very quick churn in the system. Further, it typically takes some time to wake up another core and the sampling delay may be larger than the wake time.

Moving to decision 706, a core controller may determine whether the die temperature is equal to a critical condition. For example, the critical condition may be threshold temperature above which operation of the device may begin to break down due to temperature issues.

At decision 706, if the die temperature does not equal a critical condition, the method 700 may return to block 702 and the method 700 may continue as described herein. Otherwise, if the die temperature does equal a critical condition, the method 700 may move to decision 708 and the core controller may determine whether a second core is dormant, e.g., the second core may be a CPU1 (the first core may be CPU0). If the second core is not dormant, the method 700 may proceed to decision 802 of FIG. 8 and the method 700 may continue as described herein.

Otherwise, if CPU1 is not dormant, i.e., CPU1 is powered off, the method 700 may proceed to decision 710. At decision 710, a controller may determine whether a degree of parallelism meets a condition. Specifically, the controller may determine whether the degree of parallelism is greater than a predetermined threshold indicating that there is enough parallelism in the system to warrant the operation of a second core, CPU1.

At decision 710, if the degree of parallelism does not meet the condition, the method may move to block 712 and the frequency of the first core, CPU0, may be set, or otherwise moved, to the maximum of lowering the frequency of the first core one incremental step and an optimal frequency, $F_{opt}$. In other words, the core controller may reduce the frequency of the second core one incremental step without going below an optimal frequency, $F_{opt}$. Thereafter, the method 700 may return to block 702 and the method 700 may continue as described herein.

Returning to decision 710, if the degree of parallelism meets the condition, the method may proceed to block 714 and the second CPU, CPU1, may be turned on. Thereafter, at block 716, the frequency of the second core, CPU1, may be set to an optimal frequency, $F_{opt}$. Further, at block 716, the frequency of the first core, CPU0, may be set to the maximum of the current frequency of the first core minus the optimal frequency, $F_{opt}$, or the optimal frequency, $F_{opt}$.

Moving to decision 718, the controller may determine whether there is sustained parallelism in the system. In other words, the controller may determine whether the degree of parallelism in the system meets a condition for at least a predetermined amount of time warranting the continued operation of both cores. The condition may be a threshold value of parallelism and if the parallelism in the system is greater than the threshold value, the condition may be considered met. At decision 718, if the parallelism is sustained, the method 700 may return to block 702 and the method 700 may continue as described herein.

Returning to decision 718, if the parallelism is not sustained, the method 700 may proceed to block 720 and the second core, CPU1, may be turned off. Thereafter, the method 700 may return to block 702 and the method 700 may continue as described herein.

Returning to decision 708, if the second core, CPU1, is not dormant, the method 700 may move to decision 802. At decision 802, the core controller may determine whether an Nth core, CPUN is dormant. If the Nth core is not dormant, the method 700 may proceed to block 804. At block 804, the frequency of the first core, CPU0, may be set, or otherwise moved, to the maximum of lowering the frequency of the first core one incremental step and an optimal frequency, $F_{opt}$. In other words, the core controller may reduce the frequency of the second core one incremental step without going below an optimal frequency, $F_{opt}$. Further, the frequency of the second core, CPU1, may be set, or otherwise moved to the maximum of lowering the frequency of the first core one incremental step and an optimal frequency, $F_{opt}$. Also, the frequency of the Nth core, CPUN, may be set, or otherwise moved to the maximum of lowering the frequency of the first core one incremental step and an optimal frequency, $F_{opt}$. From block 804, the method 700 may return to block 702 of FIG. 7 and the method 700 may continue as described.

Returning to decision 802, if CPUN is dormant, the method 700 may proceed to decision 806. At decision 806, a controller may determine whether a degree of parallelism meets a condition. Specifically, the controller may determine whether the degree of parallelism is greater than a predetermined threshold indicating that there is enough parallelism in the system to warrant the operation of an Nth core, CPUN.

At decision 806, if the degree of parallelism does not meet the condition, the method may move to block 808 and the frequency of the first core, CPU0, may be set, or otherwise moved, to the maximum of lowering the frequency of the first core one incremental step and an optimal frequency, $F_{opt}$. In other words, the core controller may reduce the frequency of the second core one incremental step without going below an optimal frequency, $F_{opt}$. Also, at block 808, the frequency of the second core, CPU1, may be set, or otherwise moved, to the maximum of lowering the frequency of the first core one incremental step and an optimal frequency, $F_{opt}$. Thereafter, the method 700 may return to block 702 of FIG. 7 and the method 700 may continue as described herein.

Returning to decision 806, if the degree of parallelism meets the condition, the method may proceed to block 810 and the Nth CPU, CPUN, may be turned on. Thereafter, at block 812, the frequency of the Nth core, CPUN, may be set to an optimal frequency, $F_{opt}$. Further, at block 812, the frequency of the first core, CPU0, and the second core, CPU1, may be set to the maximum of the current frequency of the first core minus the optimal frequency, $F_{opt}$, or the optimal frequency, $F_{opt}$.

Moving to decision 814, the controller may determine whether there is sustained parallelism in the system. In other words, the controller may determine whether the degree of parallelism in the system meets a condition for at least a predetermined amount of time to warrant the operation of N cores. The condition may be a threshold value of parallelism and if the parallelism in the system is greater than the threshold value, the condition may be considered met. At decision

814, if the parallelism is sustained, the method 700 may return to block 702 of FIG. 7 and the method 700 may continue as described herein.

Returning to decision 814, if the parallelism is not sustained, the method 700 may proceed to block 816 and one or more cores may be turned off. Thereafter, the method 700 may return to block 702 of FIG. 7 and the method 700 may continue as described herein.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

In a particular aspect, it may be appreciated that dynamic power in a system is proportional to $V^2 f$, where f is the clock frequency and V represents voltage. Voltage is also positively correlated with frequency. In other words, there exists a minimum voltage for the CPU to run at a given clock frequency. As such, the heat generated at the die roughly proportional to $f^3$. In certain aspects, it may be possible that when a particular device is assembled, the device may not be able to sufficiently dissipate the heat generated when a CPU core is run at or near its highest frequency.

The system and method disclosed herein provides a way to prevent overheating of a device by exploiting the parallelism in the system and spreading the workload across multiple cores, thereby running each core at much lower frequency. Because of cubic non-linearity in heat generation with respect to clock frequency, running two cores at lower frequencies will result in generating a lot less heat compared to when it is run on a single core, without sacrificing user experience.

In a particular aspect, the degree of parallelism in the workload may be dynamically inferred at task/thread level by monitoring an operating system state. For example, one operating system state that may be monitored is the length of all OS scheduler ready-to-run queues. The scheduler ready-to-run queue is a list of current tasks of threads that are available for scheduling on CPUs.

Using a parallelism monitor, the system may be able to determine whether there is sufficient parallelism in the system at any point of time and whether the parallelism is sustained over a period of time. Both these may be used in the load balancing algorithm described herein.

The load-balancing algorithm disclosed herein may take periodically measured die temperature as one of the inputs. Further, the load-balancing algorithm may compare the die temperature to a threshold temperature, $T_{HS}$, which is the highest temperature still considered safe for proper operation of a handset. In a particular embodiment, $T_{HS}$ may be found through experimentation.

In a particular aspect, for each core, there exists a most power efficient voltage and frequency point, $F_{opt}$. $F_{opt}$ may be near the highest frequency level that the minimum operating voltage can sustain. For a homogeneous dual CPU-core based system, both cores running at $F_{opt}$ may not generate enough heat to take the temperature beyond $T_{HS}$. During operation, the CPU operating frequencies may be incrementally changed and are often a handful of discrete values, typically in steps of 50-100 MHz.

Starting at any point of time, if the temperature sensor ever crosses temperature threshold $T_{HS}$, a controller may check if one core or both cores are running. If only one core is running, the controller checks if there is enough parallelism in the system. If there enough parallelism, the controller may bring up the second core at $F_{opt}$ while reducing the frequency of the first core by the same amount unless doing so would bring the frequency below $F_{opt}$. If reducing the frequency of the first core would bring the frequency below $F_{opt}$, the controller leaves the first core at $F_{opt}$. Again, it may be appreciated that running both cores running at Fopt, may not increase the temperature beyond $T_{HS}$. Spreading the work between two cores may cool down the system without loss of MIPS and harming the user experience.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of controlling power in a multicore system, the method comprising:
   determining a first frequency value ($F_{opt1}$) for a first core of the multicore system;
   determining a second frequency value ($F_{opt2}$) for a second core of the multicore system;
   monitoring a sensor that can be used to measure die temperature to obtain a first sensor value;
   determining whether the first sensor value is greater than or equal to a first threshold value;
   determining an operating frequency of the second core;
   determining whether the operating frequency of the second core is below the second frequency value ($F_{opt2}$);
   determining a degree of parallelism within a workload of the multicore system based on a length of a plurality of operating system scheduler ready-to-run queues;
   determining whether the degree of parallelism is greater than a second threshold value;
   decreasing an operating frequency of the first core to the first frequency value ($F_{opt1}$) in response to determining that the degree of parallelism is greater than the second threshold value, that the first sensor value is greater than or equal to the first threshold value, and that the operating frequency of second core is below the second frequency value (Fopt2); and
   increasing the operating frequency of the second core to the second frequency value ($F_{opt2}$) in response to determining that the degree of parallelism is greater than the second threshold value, that the first sensor value is greater than or equal to the first threshold value, and that the operating frequency of the second core is below the second frequency value ($F_{opt2}$).

2. The method of claim 1, wherein determining whether the first sensor value is greater than or equal to the first threshold value comprises determining whether the first sensor value is greater than or equal to a critical condition value above which the multicore system is determined to begin malfunctioning.

3. The method of claim 1, wherein decreasing the operating frequency of the first core to the first frequency value ($F_{opt1}$) comprises incrementally reducing the operating frequency of the first core in steps.

4. The method of claim 3, further comprising decreasing the operating frequency of the second core by one step without going below the second frequency value ($F_{opt2}$) in response to determining that the operating frequency of the second core is below the second frequency value ($F_{opt2}$).

5. The method of claim 1, wherein increasing the operating frequency of the second core to the second frequency value ($F_{opt2}$) comprises powering the second core.

6. The method of claim 1, further comprising determining whether the degree of parallelism is sustained over a period of time.

7. The method of claim 6, further comprising powering off the second core in response to determining that the degree of parallelism is not sustained over the period of time.

8. A multicore computing device, comprising:
a processing core configured with processor-executable instructions to perform operations comprising:
determining a first frequency value ($F_{opt1}$) for a first core of the multicore computing device;
determining a second frequency value ($F_{opt2}$) for a second core of the multicore computing device;
monitoring a sensor that can be used to measure die temperature to obtain a first sensor value;
determining whether the first sensor value is greater than or equal to a first threshold value;
determining an operating frequency of the second core;
determining whether the operating frequency of the second core is below the second frequency value ($F_{opt2}$);
determining a degree of parallelism within a workload of the multicore computing device based on a length of a plurality of operating system scheduler ready-to-run queues;
determining whether the degree of parallelism is greater than a second threshold value;
decreasing an operating frequency of the first core to the first frequency value ($F_{opt1}$) in response to determining that the degree of parallelism is greater than the second threshold value, that the first sensor value is greater than or equal to the first threshold value, and that the operating frequency of second core is below the second frequency value (Fopt2); and
increasing the operating frequency of the second core to the second frequency value ($F_{opt2}$) in response to determining that the degree of parallelism is greater than the second threshold value, that the first sensor value is greater than or equal to the first threshold value, and that the operating frequency of the second core is below the second frequency value ($F_{opt2}$).

9. The multicore computing device of claim 8, wherein the processor is configured with processor-executable instructions to perform operations such that determining whether the first sensor value is greater than or equal to the first threshold value comprises determining whether the first sensor value is greater than or equal to a critical condition value above which the multicore computing device is determined to begin malfunctioning.

10. The multicore computing device of claim 8, wherein the processor is configured with processor-executable instructions to perform operations such that decreasing the operating frequency of the first core to the first frequency value ($F_{opt1}$) comprises incrementally reducing the operating frequency of the first core in steps.

11. The multicore computing device of claim 10, wherein the processor is configured with processor-executable instructions to perform operations further comprising decreasing the operating frequency of the second core by one step without going below the second frequency value ($F_{opt2}$) in response to determining that the operating frequency of the second core is below the second frequency value ($F_{opt2}$).

12. The multicore computing device of claim 8, wherein the processor is configured with processor-executable instructions to perform operations such that increasing the operating frequency of the second core to the second frequency value ($F_{opt2}$) comprises powering the second core.

13. The multicore computing device of claim 8, wherein the processor is configured with processor-executable instructions to perform operations further comprising determining whether the degree of parallelism is sustained over a period of time.

14. The multicore computing device of claim 13, wherein the processor is configured with processor-executable instructions to perform operations further comprising powering off the second core in response to determining that the degree of parallelism is not sustained over the period of time.

15. A non-transitory computer-readable storage medium having stored thereon processor executable instructions configured to cause a processor to perform operations for controlling power in a multicore system, the operations comprising:
determining a first frequency value ($F_{opt1}$) for a first core of the multicore system;
determining a second frequency value ($F_{opt2}$) for a second core of the multicore system;
monitoring a sensor that can be used to measure die temperature to obtain a first sensor value;
determining whether the first sensor value is greater than or equal to a first threshold value;
determining an operating frequency of the second core;
determining whether the operating frequency of the second core is below the second frequency value ($F_{opt2}$);
determining a degree of parallelism within a workload of the multicore system based on a length of a plurality of operating system scheduler ready-to-run queues;
determining whether the degree of parallelism is greater than a second threshold value;
decreasing an operating frequency of the first core to the first frequency value ($F_{opt1}$) in response to determining that the degree of parallelism is greater than the second threshold value, that the first sensor value is greater than or equal to the first threshold value, and that the operating frequency of second core is below the second frequency value (Fopt2); and
increasing the operating frequency of the second core to the second frequency value ($F_{opt2}$) in response to determining that the degree of parallelism is greater than the second threshold value, that the first sensor value is greater than or equal to the first threshold value, and that the operating frequency of the second core is below the second frequency value ($F_{opt2}$).

16. The non-transitory computer-readable storage medium of claim 15, wherein the stored processor-executable instructions are configured to cause the processor to perform operations such that determining whether the first sensor value is greater than or equal to the first threshold value comprises determining whether the first sensor value is greater than or equal to a critical condition value above which the multicore system is determined to begin malfunctioning.

17. The non-transitory computer-readable storage medium of claim 15, wherein the stored processor-executable instructions are configured to cause the processor to perform operations such that decreasing the operating frequency of the first core to the first frequency value ($F_{opt1}$) comprises incrementally reducing the operating frequency of the first core in steps.

18. The non-transitory computer-readable storage medium of claim 17, wherein the stored processor-executable instructions are configured to cause the processor to perform operations further comprising decreasing the operating frequency of the second core by one step without going below the second frequency value ($F_{opt2}$) in response to determining that the operating frequency of the second core is below the second frequency value ($F_{opt2}$).

19. The non-transitory computer-readable storage medium of claim 15, wherein the stored processor-executable instructions are configured to cause the processor to perform operations such that increasing the operating frequency of the second core to the second frequency value ($F_{opt2}$) comprises powering the second core.

20. The non-transitory computer-readable storage medium of claim 15, wherein the stored processor-executable instructions are configured to cause the processor to perform operations further comprising determining whether the degree of parallelism is sustained over a period of time.

21. The non-transitory computer-readable storage medium of claim 20, wherein the stored processor-executable instructions are configured to cause the processor to perform operations further comprising powering off the second core in response to determining that the degree of parallelism is not sustained over the period of time.

22. A multicore computing device, comprising:
a first core;
a second core;
means for determining a first frequency value ($F_{opt1}$) for the first core;
means for determining a second frequency value ($F_{opt2}$) for the second core;
means for monitoring a sensor that can be used to measure die temperature to obtain a first sensor value;
means for determining whether the first sensor value is greater than or equal to a first threshold value;
means for determining an operating frequency of the second core;
means for determining whether the operating frequency of the second core is below the second frequency value ($F_{opt2}$);
means for determining a degree of parallelism within a workload based on a length of a plurality of operating system scheduler ready-to-run queues;
means for determining whether the degree of parallelism is greater than a second threshold value;
means for decreasing an operating frequency of the first core to the first frequency value ($F_{opt1}$) in response to determining that the degree of parallelism is greater than the second threshold value, that the first sensor value is greater than or equal to the first threshold value, and that the operating frequency of second core is below the second frequency value (Fopt2); and
means for increasing the operating frequency of the second core to the second frequency value ($F_{opt2}$) in response to determining that the degree of parallelism is greater than the second threshold value, that the first sensor value is greater than or equal to the first threshold value, and that the operating frequency of the second core is below the second frequency value ($F_{opt2}$).

23. The computing device of claim 22, wherein means for determining whether the first sensor value is greater than or equal to the first threshold value comprises means for determining whether the first sensor value is greater than or equal to a critical condition value above which the computing device is determined to begin malfunctioning.

24. The computing device of claim 22, wherein means for decreasing the operating frequency of the first core to the first frequency value ($F_{opt1}$) comprises means for incrementally reducing the operating frequency of the first core in steps.

25. The computing device of claim 24, further comprising means for decreasing the operating frequency of the second core by one step without going below the second frequency value ($F_{opt2}$) in response to determining that the operating frequency of the second core is below the second frequency value ($F_{opt2}$).

26. The computing device of claim 22, wherein means for increasing the operating frequency of the second core to the second frequency value ($F_{opt2}$) comprises means for powering the second core.

27. The computing device of claim 22, further comprising means for determining whether the degree of parallelism is sustained over a period of time.

28. The computing device of claim 27, further comprising means for powering off the second core in response to determining that the degree of parallelism is not sustained over the period of time.

* * * * *